March 8, 1966 O. W. OERMAN ETAL 3,239,014
HITCH DEVICE
Filed May 18, 1964
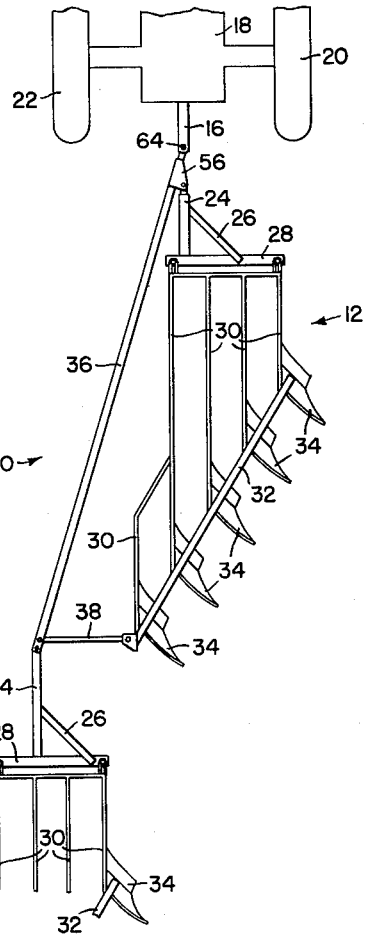
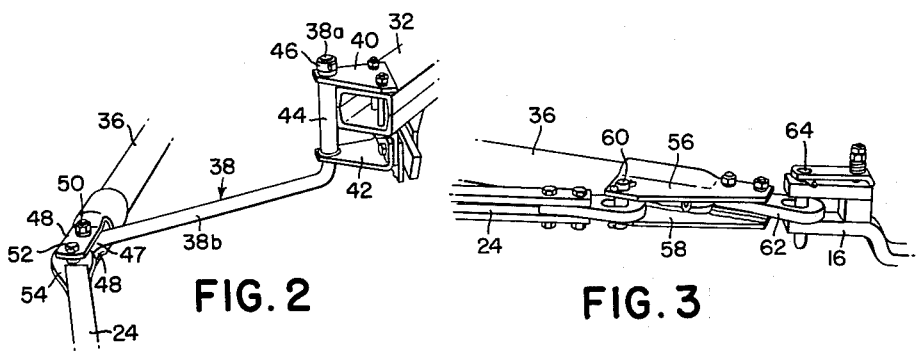
INVENTORS.
OREY W. OERMAN
WILLIAM V. LOHRMAN
BY
ATTORNEY

United States Patent Office 3,239,014
Patented Mar. 8, 1966

3,239,014
HITCH DEVICE
Orey W. Oerman, Moline, Ill., and William V. Lohrman, Davenport, Iowa, assignors to Deere & Company, Moline, Ill., a corporation of Delaware
Filed May 18, 1964, Ser. No. 367,942
1 Claim. (Cl. 172—657)

The present invention relates generally to agricultural implements, and more particularly to tandem hitch devices for moldboard plows and the like.

In many areas the flexibility and versatility of two drawn gang plows hitched in tandem are preferred over multiple bottoms suspended from a single rigid frame. Also, more bottoms can be handled in light draft soil conditions than in average or heavy draft soil conditions. Thus on a farm in which the draft soil conditions vary it may be desirable to use two gang plows in tandem in light soil conditions and one gang plow in heavy or average soil conditions.

It is therefore an object of the present invention to provide an improved tandem hitch device for interconnecting two drawn gang plows.

Other objects and advantages of the present invention will be apparent to those skilled in the art after a consideration of the following detailed description, taken in conjunction with the accompanying drawings, in which the preferred form of this invention is illustrated.

FIG. 1 is a somewhat diagrammatic plan view showing the tandem hitch device of this invention interconnecting a tractor drawbar with front and rear tractor drawn gang plows, only a portion of the rear gang plow being illustrated.

FIG. 2 is an enlarged perspective view showing a rear portion of applicants' tandem hitch device.

FIG. 3 is an enlarged perspective view showing a front portion of applicants' tandem hitch device.

In the following description moldboard side reference is determined by that side which the moldboards of the plow bottoms face, i.e., to the right; and similarly landward side reference is determined by that side which the landsides of the plow bottoms face.

Referring first to FIG. 1 applicants' tandem hitch device indicated generally at 10 is adapted to interconnect a front or first tractor drawn gang plow, indicated generally at 12, a second or rear tractor drawn gang plow, a portion of which is indicated generally at 14, and a tractor drawbar 16, the tractor drawbar being mounted on a generally conventional farm tractor 18 having spaced apart rear wheels 20 and 22.

The plows with which the tandem hitch device of this invention are adapted to be used are generally conventional and include a forwardly extending hitch drawbar 24, a diagonal brace 26, and a hitch crossbar 28, the hitch drawbar being adjustably positionable on the hitch drawbar in a conventional manner not illustrated. The plow may also include rearwardly extending frame bars 30 and a diagonally extending truss box or bar 32 which interconnects the rearward ends of the frame bars 30 and from which plow bottoms 34 are supported in a conventional manner. The plow bottoms are conventional and have a moldboard (on the right in FIG. 1) and a landside (on the left in FIG. 1).

The tandem hitch device of the present invention includes a pull pipe 36 which is securable at its forward end to the tractor drawbar 16, the rearward end of the pull pipe being securable to the hitch drawbar 24 of the rear or second tractor drawn gang plow 14, the rear end of the pull pipe 36 being supported by and spaced away from the rear of the first or front tractor drawn gang plow 12 by means of a pivoted supporting brace 38. The pivoted supporting brace 38 is supported on the rear of the truss box or bar 32 of the first or front tractor drawn gang plow 12 by means of upper and lower apertured plates 40 and 42, respectively. The plates 40 and 42 are rigidly secured to the truss box or bar in a generally conventional manner, such as for example by nuts and bolts. Each of the plates 40 and 42 is provided with an aperture (not shown) on its left-hand end and a sleeve member 44 is welded or otherwise secured to the plates 40 and 42 about the apertures. One end 38a of the pivoted supporting brace is disposed at generally right angle to the principal portion 38b of the brace, and the angularly disposed portion 38a is disposed within the sleeve 44 and apertures, and is held for adjustable up-and-down movement by means of upper and lower collars 46 (only the upper collar being shown in FIG. 2). The left-hand end of the brace 38 is provided with eye means 47 that is securable to the rear end of the pull pipe 36. To this end upper and lower spaced apart members are rigidly secured to the rear end of the pull pipe 36, each of these members being provided with two apertures, the apertures in one member being in alinement with the apertures in the other member. Pin means, such as for example a conventional nut and bolt, is disposable within one pair of alined apertures and pass through the eye at the left end of the brace 38 to secure this member to the rear end of the pull pipe 36. A second pin 52 is disposed within the second pair of alined apertures in the spaced apart members 48 and passes through a hitch loop 54 of the hitch drawbar 24 of the second or rear tractor drawn gang plow 14 and thus secures the rear drawn plow to the rear end of the pull pipe 36. It should be noted that other generally conventional fastener means could be employed to pivotally secure the left-hand end of the brace 38 to the rear end of the pull pipe 36 and the plow drawbar 24 of the second or rear plow to the rear end of the pull pipe 36. Thus for example the brace 38 could be provided with an outwardly extending bail which could in turn be pinned directly to the pipe 36. Also the plow drawbar could be provided with a generally conventional hitch clevis which could also be pinned to the rear of the pull pipe 36.

The forward end of the pull pipe 36, as best shown in FIG. 3, is provided with upper and lower spaced apart plates 56 and 58, respectively. Each of the plates is provided with a right-hand extending portion (as viewed from FIG. 1) that is apertured and adapted to receive a pin 60, the pin 60 serving to secure the forward end of the first or front drawn gang plow to the forward end of the tandem hitch device. The upper and lower spaced apart plates 56 and 58 are also provided with forwardly extending portions to which are secured conventional fastener means such as a hitch loop 62. The hitch loop 62 is secured in a generally conventional manner to the tractor drawbar by means of a pin 64.

In operation the front plow hitch is set to the left or landward side to allow the tractor wheels to run on the land, as can be seen from FIG. 1, and the rear tractor drawbar is set in such a manner that the right-hand bottom of the second gang plow will be spaced to the left of the rear bottom of the front gang plow a distance equal to the width of the cut of one bottom. When the plows 12 and 14 are pulled forwardly by the tractor 18, the second plow 14 will exert a side force through the brace 38 upon the plow 12 thus relieving landside pressure and reducing the draft force necessary to propel the the plows. The reason that the second plow will exert a sidewards pressure is that its center line of draft is disposed to the left of the tractor drawbar and thus a right-hand component of force will be exerted against the front plow 12 through the brace 38. It should be noted that the brace 38 holds up the front end of the rear plow drawbar 24 and holds it in a fixed relationship to the front plow 12.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

We claim:

A tractor provided with a drawbar, a first drawn plow and a second drawn plow, each of said plows having a longitudinally extending main frame structure from which depends a plurality of moldboard bottoms, a hitch crossbar, and a hitch drawbar adjustably secured to said hitch crossbar for transverse movement, the combination therewith of a tandem hitch device interconnecting said first drawn plow, said second drawn plow, and said tractor hitch drawbar with each other, said tandem hitch device comprising a substantially straight pull pipe pivotally secured to and supported by said tractor drawbar at its forward end and extending generally rearwardly and to the landward side, means interconnecting the hitch drawbar of said first drawn plow with a forward portion of said pull pipe, the hitch drawbar of the first drawn plow being adjustably positioned to the landward side of said hitch crossbar whereby said first drawn plow is generally offset to the moldboard side with respect to said tractor and said tractor runs on unplowed land, supporting structure rigidly secured to a rear portion of the front plow, said supporting structure comprising upper and lower spaced apart plates secured at one side to a rear portion of the first plow, said upper and lower plates being provided with vertically aligned apertures, a rigid brace having an upturned end carried within the aligned apertures of the supporting structure for swinging movement of the other end of the brace only about a generally vertically extending axis, and a second connecting structure on the other end of the pull pipe carried and supported solely by the rigid brace at a relatively fixed elevation and to which the hitch drawbar of the rear gang is swingably secured, said second connecting structure comprising spaced apart plates rigidly secured to the rearward end of the pull pipe, each of the rearwardly extending plates being provided with aligned aperture means, and pins disposable with the aligned apertures to secure the brace and the hitch crossbar of the second plow to the rear end of the pull pipe, the parts being so arranged and constructed that during plowing the second gang plow develops a side thrust which acts through the rigid brace to relieve pressure on the landsides of the first drawn plow.

References Cited by the Examiner

UNITED STATES PATENTS

| 1,446,118 | 2/1923 | Graham et al. | 172—310 |
| 2,060,196 | 11/1936 | Goodman | 280—411 |
| 2,136,550 | 11/1938 | Howard | 172—314 X |
| 2,515,016 | 7/1950 | McClintock | 172—314 X |

FOREIGN PATENTS 148,178  12/1954  Sweden.

ABRAHAM G. STONE, *Primary Examiner.*

T. GRAHAM CRAVER, ANTONIO F. GUIDA,
*Examiners.*